(12) United States Patent
Kamiya

(10) Patent No.: US 9,966,815 B2
(45) Date of Patent: May 8, 2018

(54) STATOR INCLUDING A BRACKET, ELECTRIC MOTOR INCLUDING A STATOR, AND METHOD OF PRODUCING AN ELECTRIC MOTOR

(71) Applicant: FANUC CORPORATION, Yamanashi (JP)

(72) Inventor: Youhei Kamiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 49 days.

(21) Appl. No.: 14/495,948

(22) Filed: Sep. 25, 2014

(65) Prior Publication Data
US 2015/0084447 A1 Mar. 26, 2015

(30) Foreign Application Priority Data

Sep. 26, 2013 (JP) .................................. 2013-200228

(51) Int. Cl.
*H02K 5/22* (2006.01)
*H02K 1/12* (2006.01)
(Continued)

(52) U.S. Cl.
CPC .............. *H02K 5/225* (2013.01); *H02K 1/12* (2013.01); *H02K 15/12* (2013.01); *H02K 15/14* (2013.01);
(Continued)

(58) Field of Classification Search
CPC .. H02K 1/04; H02K 1/12; H02K 3/44; H02K 5/22; H02K 5/225; H02K 15/14
(Continued)

(56) References Cited

U.S. PATENT DOCUMENTS 2,872,599 A * 2/1959 De Young .............. H02K 3/522
310/71
2,944,297 A * 7/1960 Maynard .............. H02K 5/1285
310/71
(Continued)

FOREIGN PATENT DOCUMENTS

CN 101153793 A 4/2008
CN 102011729 A 4/2011
(Continued)

OTHER PUBLICATIONS

English Translation of Abstract for Japanese Publication No. 58-043156, published Mar. 12, 1983, 1 page.
(Continued)

*Primary Examiner* — Michael Andrews
(74) *Attorney, Agent, or Firm* — Fredrikson & Byron, P.A.

(57) ABSTRACT

A method of producing an electric motor which can prevent resin from ending up leaking from an opening for lead wire use when performing a step of filling a resin in the internal space of the electric motor, provided with a step of attaching a bracket which has an opening for leading lead wires of a coil to the outside, a step of arranging a seal member which has through holes which hold the lead wires at the opening so as to tightly contact without clearance the wall surfaces which define the opening while passing the lead wires through the through holes, and a step of filling a resin in the internal space which is defined by the bracket and the stator core.

6 Claims, 9 Drawing Sheets

(51) Int. Cl.
*H02K 15/12* (2006.01)
*H02K 15/14* (2006.01)
*H02K 15/02* (2006.01)

(52) U.S. Cl.
CPC ......... *H02K 15/02* (2013.01); *Y10T 29/49009* (2015.01)

(58) Field of Classification Search
USPC .................................. 310/43, 71, 87, 88, 85
See application file for complete search history.

(56) References Cited

U.S. PATENT DOCUMENTS

| | | | |
|---|---|---|---|
| 3,308,316 A | 3/1967 | Pfahl | |
| 3,638,055 A | 1/1972 | Zimmerman | |
| 4,851,725 A * | 7/1989 | Keck | H02K 5/225 310/71 |
| 4,965,409 A | 10/1990 | Lindroos | |
| 2008/0073987 A1 * | 3/2008 | Kataoka | H02K 3/522 310/71 |
| 2011/0058973 A1 * | 3/2011 | Yamada | H02K 5/12 418/55.1 |

FOREIGN PATENT DOCUMENTS

| | | |
|---|---|---|
| CN | 204205803 U | 3/2015 |
| DE | 1935929 A1 | 1/1971 |
| JP | 58-043156 A | 3/1983 |
| JP | H02-14260 U | 1/1990 |
| JP | H02253059 A | 10/1990 |
| JP | H0556611 A | 3/1993 |
| JP | 7231602 A | 8/1995 |
| JP | 2003-32953 A | 1/2003 |
| JP | 2008-105526 A | 5/2008 |

OTHER PUBLICATIONS

Concise Explanation of JP S58-043156 A, 1 page, for publication dated Mar. 12, 1983.
English Translation of Japanese Publication No. 2003-032953, published Jan. 31, 2003, 4 pages.
English Translation of Japanese Publication No. 2008-105526, published May 8, 2008, 10 pages.
Concise Explanation of JP H02-014260 U, 1 page, for publication dated Jan. 29, 1990.
English Abstract for Japanese Publication No. 0556611, published Mar. 5, 2013, 2 pgs.
Translated Decision to Grant a Patent for JP Application No. 2013-200228, dated Oct. 27, 2015, 3 pages.
Untranslated Decision to Grant a Patent for JP Application No. 2013-200228, dated Oct. 27, 2015, 3 pages.
Translated Decision of Refusal for JP Application No. 2013-200228, dated Jun. 23, 2015, 4 pages.
Untranslated Decision of Refusal for JP Application No. 2013-200228, dated Jun. 23, 2015, 5 pages.
Translated Notification of Reasons for Refusal for JP Application No. 2013-200228, dated Feb. 3, 2015, 4 pages.
Untranslated Notification of Reasons for Refusal for JP Application No. 2013-200228, dated Feb. 3, 2015, 5 pages.
English Abstract and Machine Translation for Chinese Publication No. 204205803 U, published Mar. 11, 2015, 8 pgs.
English Abstract and Machine Translation for Chinese Publication No. 102011729 A, published Apr. 13, 2011, 9 pgs.
English Abstract and Machine Translation for Chinese Publication No. 101153793 A, published Apr. 2, 2008, 7 pgs.
English Abstract and Machine Translation for Japanese Publication No. 07-231602 A, published Aug. 29, 1995, 6 pgs.
English Abstract for German Publication No. 1935929 A1, published Jan. 7, 1971, 2 pgs.

* cited by examiner

STATOR INCLUDING A BRACKET, ELECTRIC MOTOR INCLUDING A STATOR, AND METHOD OF PRODUCING AN ELECTRIC MOTOR

BACKGROUND OF THE INVENTION

1. Field of the Invention

The invention relates to a stator including a bracket, an electric motor including such a stator, and a method of producing an electric motor.

2. Description of the Related Art

In an electric motor where a stator core is provided with a bracket, from the viewpoint of improving the cooling performance, there is known an electric motor which is formed by filling an internal space which is defined by the stator core and the bracket with a heat curing resin (so-called "mold motor") (for example, Japanese Patent Publication No. 5-56611A).

In such an electric motor, an opening for leading a lead wire of the coil to the outside is formed in the bracket. In a conventional electric motor, when performing the step of filling the resin in the internal space of the electric motor, the resin may leak out from the opening for the lead wire.

SUMMARY OF THE INVENTION

In one aspect of the invention, the method of producing a stator of an electric motor comprising steps of attaching a bracket to a stator core around which a coil is wound, the bracket including an opening for leading out a lead wire of the coil; arranging a seal member in the opening so that the seal member tightly contacts a wall surface defining the opening without clearance, the seal member including a through hole for receiving the lead wire, the lead wire being inserted into the through hole; and filling a resin in an internal space defined by the bracket and the stator core.

The bracket may further include an abutting part arranged in the opening. The seal member may have a coefficient of elasticity lower than the bracket. In this case, the step of arranging the seal member in the opening may include inserting the seal member into the opening so as to abut against the abutting part from the outside in the radial direction; pressing the terminal plate for receiving the lead wire against the seal member from the outside in the radial direction; deforming the seal member by holding the seal member between the terminal plate and the abutting part; and fastening the terminal plate to the bracket when the seal member is deformed.

The seal member may have a coefficient of thermal expansion higher than the bracket. In this case, the step of arranging the seal member in the opening may include expanding the seal member by heating the seal member.

The seal member may include a main body having a bottom surface, a upper surface opposite to the bottom surface, an inner surface facing the center axis of the stator core, and an outer surface opposite to the inner surface; the through hole extending from the inner surface to the outer surface; a slit formed at the main body so as to extend from the upper surface to the through hole, and a notch formed along the corner at which the upper surface and the inner surface intersect.

The through hole may include a first hole part into which the lead wire is inserted; and a second hole part extending from the first hole part toward the upper surface and having a width smaller than the first hole part. In another aspect of the invention, an electric motor includes a stator produced by the above-mentioned method.

In still another aspect of the invention, a stator is provided with a stator core around which a coil is wound; a bracket attached to the stator core and having an opening for leading out a lead wire of the coil; a seal member arranged in the opening so as to tightly contact a wall surface defining the opening without clearance, and including a through holes for receiving the lead wire; and a resin arranged in an internal space defined by the bracket and the stator core.

The bracket may further include an abutting part arranged in the opening so as to abut against the seal member from the inside in the radial direction. The seal member may have a coefficient of elasticity lower than the bracket. The stator may be further provided with a terminal plate attached to the bracket so as to press the seal member from the outside in the radial direction. The seal member may be held between the terminal plate and the abutting part of the bracket and deformed so as to tightly contact the wall surface.

This seal member may include a main body having a bottom surface, a upper surface opposite to the bottom surface, an inner surface facing the center axis of the stator core, and an outer surface opposite to the inner surface; the through hole extending from the inner surface to the outer surface; a slit formed at the main body so as to extend from the upper surface to the through hole; and a notch formed along the corner at which the upper surface and the inner surface intersect. In still another aspect of the invention, an electric motor is provided with the above-mentioned stator.

BRIEF DESCRIPTION OF THE DRAWINGS

The above and other objects, features, and advantages of the invention will become clearer from the following description of preferred embodiments with reference to the attached drawings, in which.

DETAILED DESCRIPTION

Below, embodiments of the invention will be explained in detail based on the drawings. First, referring to FIG. 1 to FIG. 2B, an electric motor 10 according to an embodiment of the invention will be explained. Note that, in the following explanation, the "axial direction" indicates the direction of the axis O of the rotor. Further, the "radial direction" corresponds to the radial direction of a circle centered about the axis O. Further, the "right direction" corresponds to the right direction when viewing the electric motor 100 from the direction of the arrow P shown in FIG. 1 and FIG. 2A (i.e., the direction of the arrow R shown in FIG. 2A). Further, the "upper direction" corresponds to the upper direction in FIG. 1 and FIG. 2A.

Figure 1:
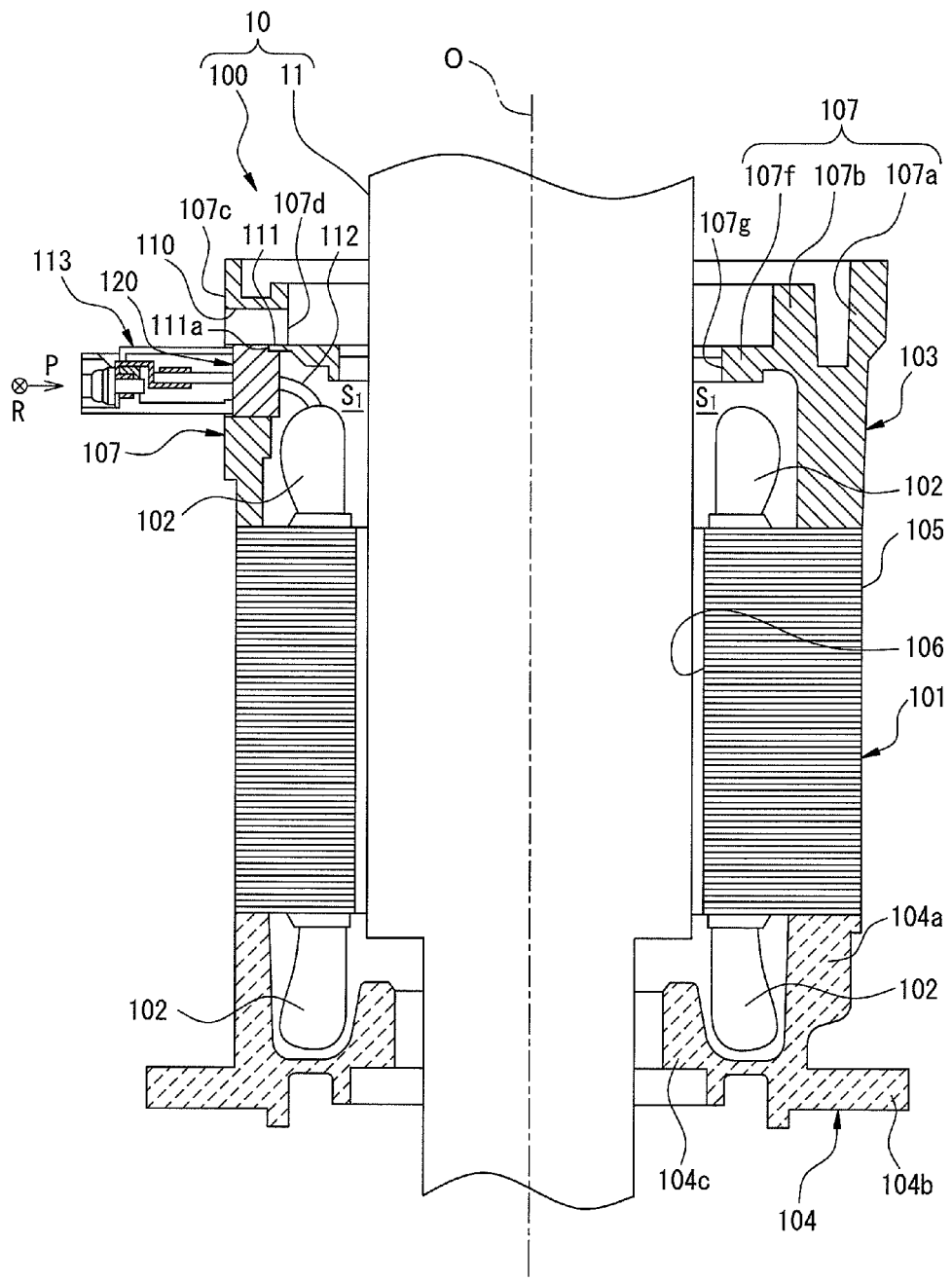
FIG. 1 shows a side cross-sectional view of an electric motor according to one embodiment of the invention.
Figure 2A:
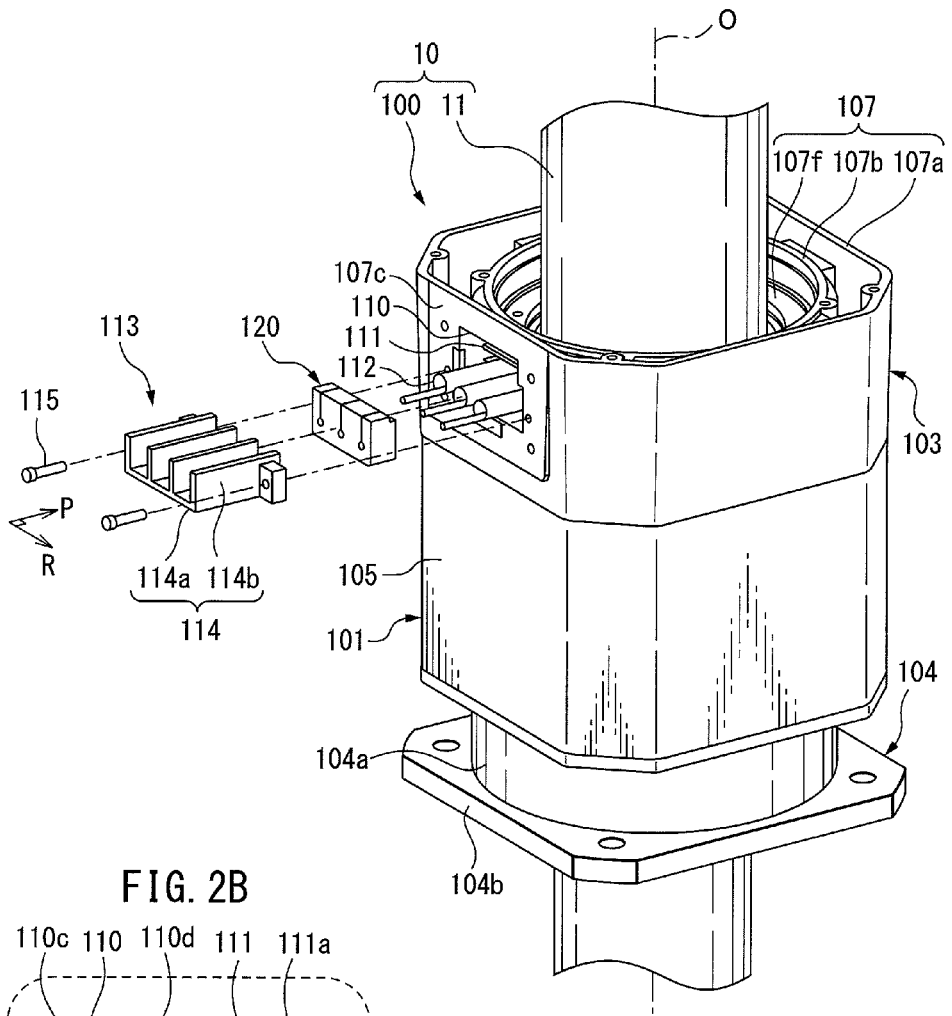
FIG. 2A is an exploded perspective view illustrating the state before assembling each member of the electric motor shown in FIG. 1.

FIG. 1 shows a side cross-sectional view of an electric motor 10, while FIG. 2A shows an exploded perspective view illustrating the state before attaching a seal member and a terminal plate to an upper bracket. The electric motor 10 is provided with a stator 100, and a rotor 11 rotatably arranged in a space $S_1$ defined inside of the stator 100. The rotor 11 is a cylindrical member extending so as to be centered about the axis O and rotates about the axis O by a rotating magnetic field generated by the stator 100.

The stator 100 includes a stator core 101; a coil 102 wound around the stator core 101, an upper bracket 103 attached to the axially upper end of the stator core 101; and a lower bracket 104 attached to the axially lower end of the stator core 101. The stator core 101 is comprised of a plurality of plates made of a ferromagnetic material, such as steel, stacked in the axial direction. The stator core 101 has an outer surface 105 of a substantially square shape when viewed from above; and an inner surface 106 which defines a cylindrical internal space.

The inner surface 106 is formed with grooves (not shown) recessed from the inner surface 106 to the outside in the radial direction (radially outside). A coil 102 is wound around each of the grooves. The center axis of the cylindrical internal space defined by the inner surface 106 matches the above axis O. Note that, in this specification, the center axis of the stator core 101 corresponds to the axis O.

The lower bracket 104 is a cylindrical member centered about the axis O and fabricated from a metal such as steel. The lower bracket 104 includes a cylindrical side wall 104a extending so as to surround the axis O; and a flange 104b connected to the lower end of the side wall 104a. A ridge part 104c is formed at the radially inner end of the flange 104b so as to extend upward from the radially inner end.

The upper bracket 103 is a cylindrical member centered about the axis O, and fabricated from a metal such as steel. The upper bracket 103 includes a side wall 107 extending so as to surround the axis O. The side wall 107 includes an outer wall 107 having a substantially square shape when viewed from upper side; an annular inner wall 107b arranged at the radially inside of the outer wall 107a so as to annularly extend in the circumferential direction; and a flange 107f extending from the annular inner wall 107b to the radially inside. A circular opening 107g centered about the axis O is formed at the center part of the flange 107f.

Figure 2B:
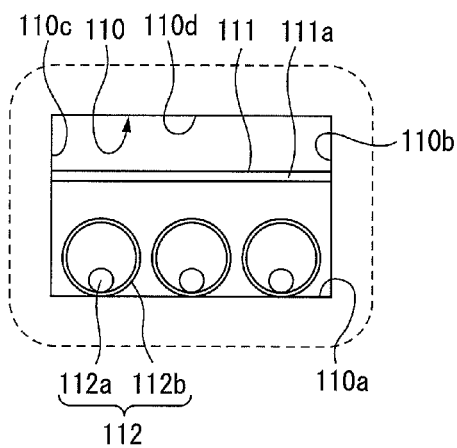
FIG. 2B is a view of an opening provided at the upper bracket as seen from the direction of an arrow P in FIG. 2A.

The upper bracket 103 includes an opening 110 extending through the side wall 107 in the radial direction. The opening 110 is formed to be a substantially rectangular shape as seen from the arrow P in the figure, and extends in the radial direction from an outer surface 107c of the outer wall 107a to the inner circumferential surface 107d of the annular inner wall 107b. More specifically, as shown in FIG. 2B, the opening 110 is defined by a bottom wall surface 110a which is a substantially horizontal flat surface; a right wall surface 110b extending upward from the right edge of the bottom wall surface 110a; a left wall surface 110c extending upward from the left edge of the bottom wall surface 110a; and a upper wall surface 110d extending parallel to the bottom wall surface 110a and connected to the right wall surface 110b and left wall surface 110c.

In the present embodiment, the side wall 107 has an abutting part 111 arranged in the opening 110. More specifically, the abutting part 111 is formed at the annular inner wall 107b of the side wall 107, is integrally connected with the right wall surface 110b and left wall surface 110c of the opening 110, and extends from the right wall surface 110b to the left wall surface 110c horizontally. In the present embodiment, the upper surface of the abutting part 111 is positioned on the same plane as the upper surface of the flange 107f.

The abutting part 111 is arranged separated downward from the upper wall surface 110d of the opening 110. Further, the radially outer end face 111a (FIG. 1 and FIG. 2B) of the abutting part 111 is arranged at a position which is radially inward relative to the outer surface 107c of the outer wall 107a and which is radially outward relative to the inner circumferential surface 107d of the annular inner wall 107b.

The lead wires 112 extending from the coil 102 pass through the opening 110 and are led to the outside of the upper bracket 103. More specifically, the lead wires 112 pass through the opening 110 in the space between the abutting part 111 and the bottom wall surface 110a to be led to the outside. In the present embodiment, a total of three lead wires 112 are led out from the coil 102. Each of the lead wires 112 includes a conductor wire 112a and a covering 112b which surrounds and covers the conductor wire 112a.

The stator 100 according to the present embodiment includes a terminal plate 113 fastened to the side wall 107 of the upper bracket 103; and a seal member 120 arranged in the opening 110 of the side wall 107. The terminal plate 113 receives and holds the lead wires 112. An electrical cord of an external device such as a power source is connected to the terminal plate 113, and the electrical cord and lead wires 112 are electrically connected to each other at the terminal plate 113.

As shown in FIG. 2A, the terminal plate 113 includes a housing 114. The housing 114 includes a bottom wall 114a; and a total of four side walls 114b extending upward from the bottom wall 114a. Each of the lead wires 112 is received and held in a pocket defined by the bottom wall 114a and two adjoining side walls 114b. The terminal plate 113 is fastened to the side wall 107 of the upper bracket 103 by bolts 115 after the seal member 120 is inserted into the opening 110.

Figure 3A:
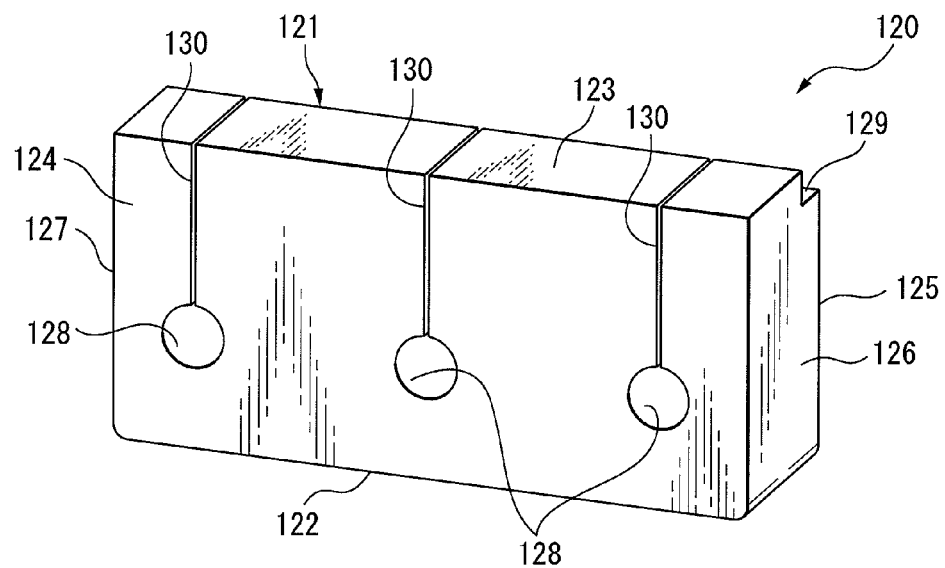
FIG. 3A is a perspective view of the seal member shown in FIG. 1.
Figure 3B:
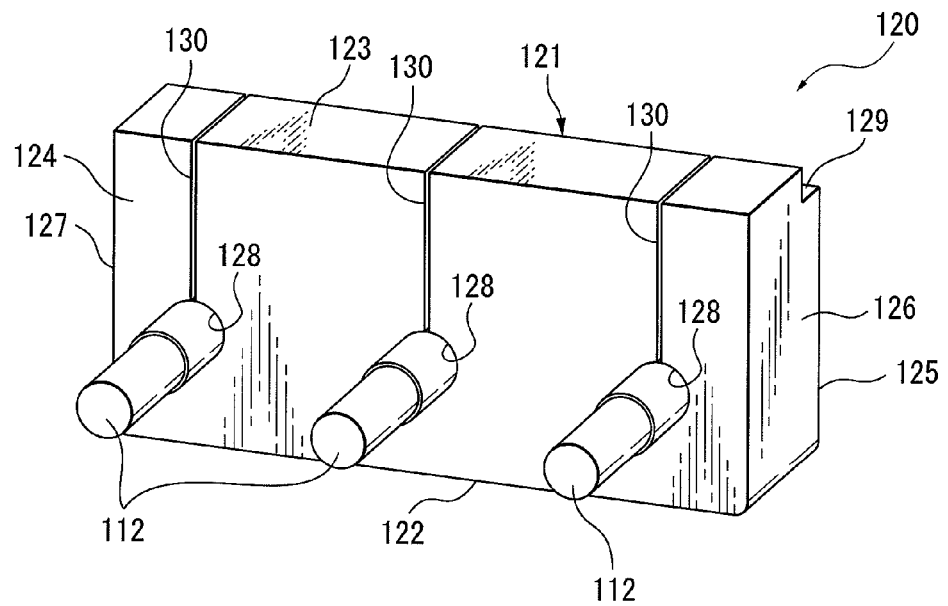
FIG. 3B illustrates the state where lead wires are inserted into the through holes of the seal member shown in FIG. 3A.

Next, referring to FIGS. 3A and 3B, the seal member 120 according to the present embodiment will be explained. The seal member 120 includes a substantially quadrangular-prism-shaped main body 121, through holes 128 and a notch part 129 which are formed in the main body 121. For example, the seal member 120 is fabricated from a rubber material such as urethane rubber, and has a lower coefficient of elasticity and higher coefficient of thermal expansion than the upper bracket 103.

The main body 121 has a bottom surface 122; a upper surface 123 positioned opposite to the bottom surface 122; an outer surface 124 extending upward from the front edge of the bottom surface 122; an inner surface 125 positioned opposite to the outer surface 124; a right end face 126 extending upward from the right edge of the bottom surface 122; and a left end face 127 positioned opposite to the right end face 126.

The inner surface 125 faces the axis O when the seal member 120 is attached to the upper bracket 103 as shown in FIG. 1, while the outer surface 124 faces the outside of the electric motor 10. A total of three through holes 128 is formed at the main body 121 so as to correspond to the lead wires 112. Each of the through holes 128 extends from the inner surface 125 to the outer surface 124. As shown in FIG. 3B, each of the through holes 128 receives each of the above-mentioned lead wires 112.

The main body 121 is formed with a total of three slits 130 extending from the upper surface 123 to the through holes 128. When inserting the lead wire 112 in the through hole 128, the user opens the slit 130 to the left and right, and then slides the lead wire 112 into the slit 130 from the upper surface 123, thereby the lead wire 112 is inserted into the through hole 128. The notch 129 is formed along the corner at which the upper surface 123 and the inner surface 125 of the main body 121 intersect. The notch 129 extends from the right end face 126 to the left end face 127.

Next, referring to FIGS. 1-3B, the attachment structure of the seal member 120 according to the present embodiment will be explained in more detail. In the state where the seal member 120 is arranged in the opening 110 of the upper bracket 103, the bottom surface 122 of the seal member 120 tightly contacts the bottom wall surface 110a of the opening 110 without clearance. Similarly, the right end face 126 and left end face 127 of the seal member 120 tightly contact the right wall surface 110b and left wall surface 110c of the opening 110 without clearance, respectively.

In addition, the abutting part 111 provided at the side wall 107 of the upper bracket 103 fits into the notch 129 provided at the seal member 120 without clearance. On the other hand, the terminal plate 113 is fastened to the upper bracket 103 so as to presses against the seal member 120 from the radially outside. Due to this, the seal member 120 is held between the terminal plate 113 and the abutting part 111 and deformed. As a result, the seal member 120 tightly contacts the wall surfaces 110a, 110b, and 110c which define the opening 110, and the abutting part 111 without clearance.

Figure 4:
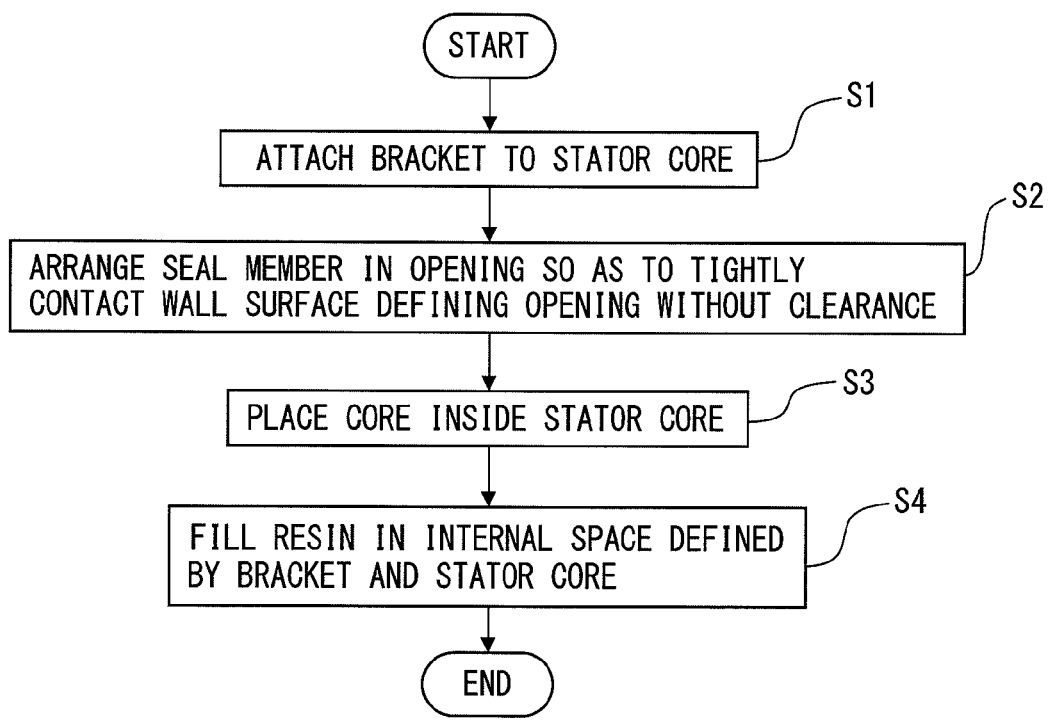
FIG. 4 is a flow chart of a method of producing a stator of an electric motor, according to an embodiment of the invention.

Next, referring to FIGS. 4-8, the method of producing the stator 100, according to one embodiment of the invention, will be explained. As shown in FIG. 4, the flow according to the present embodiment is started when the above-mentioned stator core 101, upper bracket 103, and lower bracket 104 have been provided.

At step S1, the manufacturer attaches the brackets 103 and 104 to the stator core 101. Specifically, the upper bracket 103 is attached to the upper end of the stator core 101 so as to be concentric with the axis O. Similarly, the lower bracket 104 is attached to the lower end of the stator core 101 so as to be concentric with the axis O.

At step S2, the manufacturer arranges the seal member 120 in the opening 110 so that the seal member 120 tightly contacts the wall surfaces 110a, 110b, and 110c which define the opening 110 without clearance. Details of this step S2 will be explained with reference to FIG. 5.

After the start of step S2, at step S21, the manufacturer inserts the lead wires 112 into the through holes 128 of the seal member 120. Specifically, the manufacturer opens the slits 130 formed at the seal member 120 to the left and right, and slides the lead wires 112 into the slits 130 from the upper surface 123 of the seal member 120, in order to insert the lead wires 112 in the through holes 128.

At step S22, the manufacturer inserts the seal member 120 in the opening 110 so that the seal member 120 abuts against the abutting part 111 from the radially outside. More specifically, the manufacturer, as shown in FIG. 2A, inserts the seal member 120 in the opening 110 formed at the upper bracket 103 in the direction indicated by the arrow P from the radially outside. As a result, the abutting part 111 arranged in the opening 110 fits into and abuts against the notch 129 provided at the seal member 120, thereby movement of the seal member 120 toward radially inward is restricted.

At step S23, the manufacturer presses the terminal plate 113 against the seal member 120 from the radially outside. Specifically, the manufacturer presses the housing 114 of the terminal plate 113 against the seal member 120 in the direction indicated by the arrow P from the radially outside. This state is shown in FIG. 6.

Figure 6:
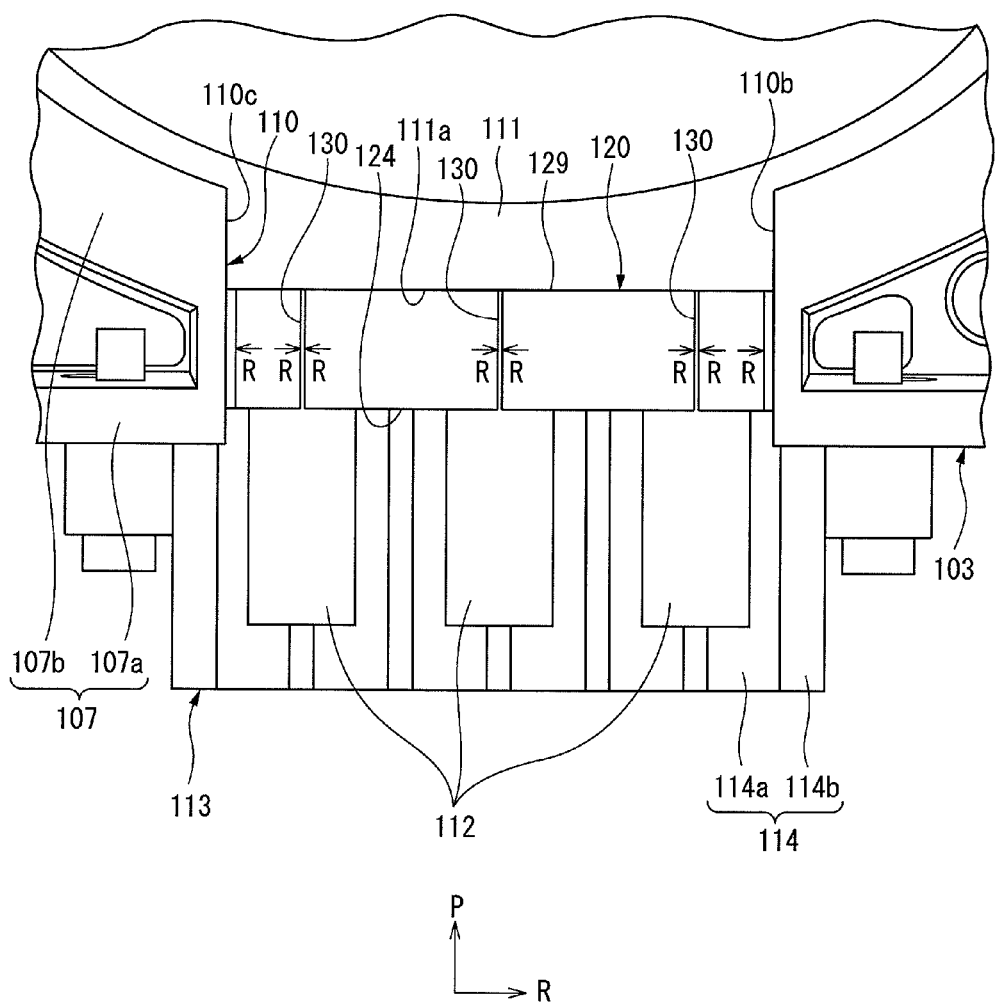
FIG. 6 is a view of the stator as seen from the upper side, in the state after step S22 in FIG. 5.

In the state shown in FIG. 6, the outer surface 124 of the seal member 120 abuts against the housing 114 of the terminal plate 113, while the notch 129 of the seal member 120 abuts against the end face 111a of the abutting part 111. Thus, the seal member 120 is arranged between the terminal plate 113 and the abutting part 111. Note that, in this state, the seal member 120 may not completely come into close-contact with the wall surfaces 110a, 110b, and 110c of the opening 110, and a partial clearance may be formed between the seal member 120 and the wall surfaces 110a, 110b, and 110c of the opening 110.

At step S24, the manufacturer deforms the seal member 120 by holding it between the terminal plate 113 and the abutting part 111. Specifically, the manufacturer further presses the terminal plate 113 against the seal member 120 toward radially inward. Then, the seal member 120 is tightly held between the terminal plate 113 and the abutting part 111.

As explained above, the seal member 120 has a coefficient of elasticity lower than the upper bracket 103. Therefore, the seal member 120 deforms so as to expand as indicated by the arrow R in FIG. 6 by being held between the terminal plate 113 and the abutting part 111. As a result, the seal member 120 becomes the state shown in FIG. 7.

Figure 7:
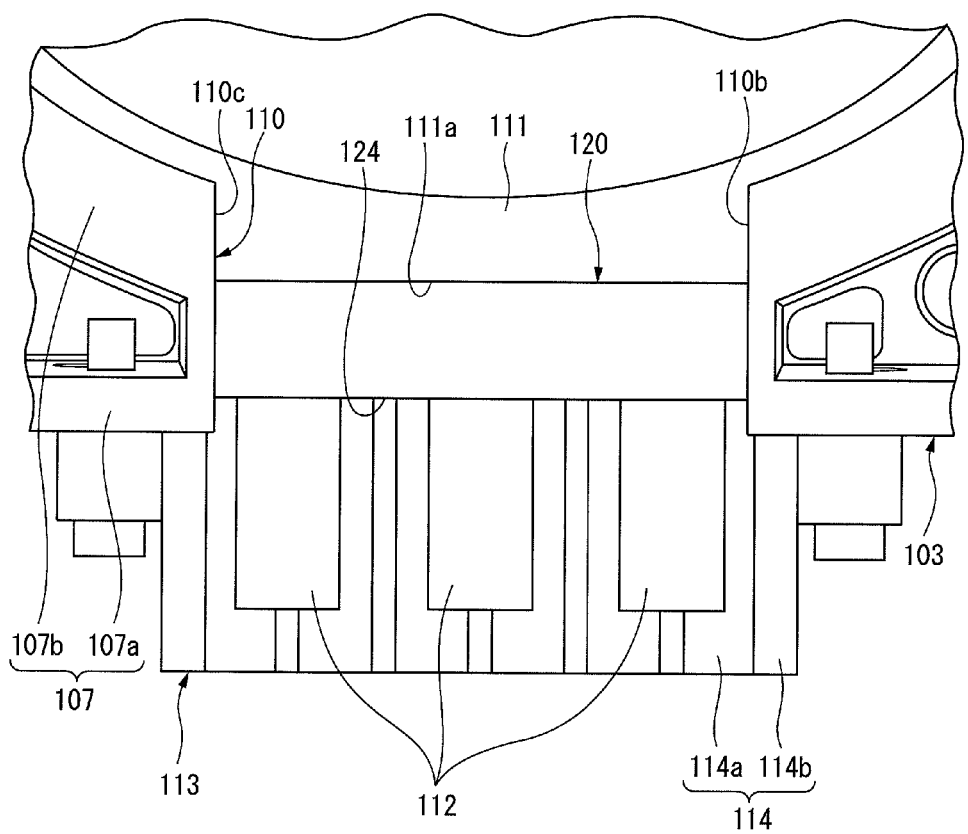
FIG. 7 is a view corresponding to FIG. 6 and shows the stator as seen from the upper side, in the state after step S24 in FIG. 5.

As shown in FIG. 7, the seal member 120 expands by being held between the terminal plate 113 and the abutting part 111, and tightly contacts the wall surfaces 110a, 110b, and 110c of the opening 110 and the abutting part 111 without clearance. More specifically, in the state shown in FIG. 7, the bottom surface 122 of the seal member 120 tightly contacts the bottom wall surface 110a of the opening 110 without clearance.

Similarly, the right end face 126 and left end face 127 of the seal member 120 tightly contact the right wall surface 110b and left wall surface 110c of the opening 110 without clearance, respectively. Further, the radially outer end face 111a of the abutting part 111 tightly contacts the wall surface defining the notch 129 of the seal member 120 without clearance. Thus, the seal member 120 completely seals the space in the opening 110 which is defined by the wall surfaces 110a, 110b, and 110c and the abutting part 111.

At step S25, the manufacturer fastens the terminal plate 113 to the upper bracket 103 in the state where the seal member 120 is deformed. Specifically, the manufacturer fastens the terminal plate 113 to the side wall 107 of the upper bracket 103 by means of bolts 115, while pressing the terminal plate 113 against the seal member 120.

At step S26, the manufacturer expands the seal member 120 by heating it. Specifically, as an example, the manufacturer uses a heating device to heat the stator 100 as a whole. As explained above, the seal member 120 has a higher coefficient of thermal expansion than the upper bracket 103. Therefore, the seal member 120 expands by a degree greater than the upper bracket 103. As a result, the seal member 120 comes into more tightly contacts with the wall surfaces 110a, 110b, and 110c of the opening 110 and the abutting part 111. Due to this, the sealing performance at the opening 110 by the seal member 120 can be further improved.

Figure 5:
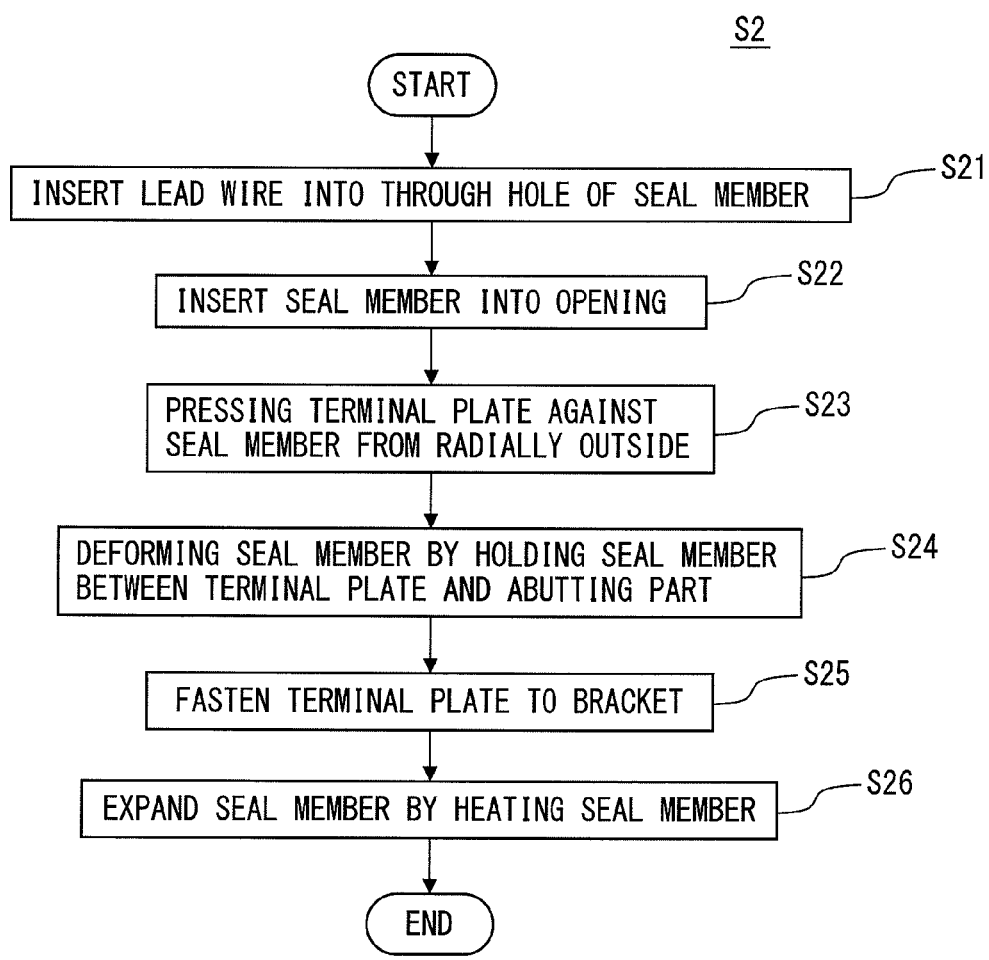
FIG. 5 is a flow chart of step S2 in FIG. 4.
Figure 8:
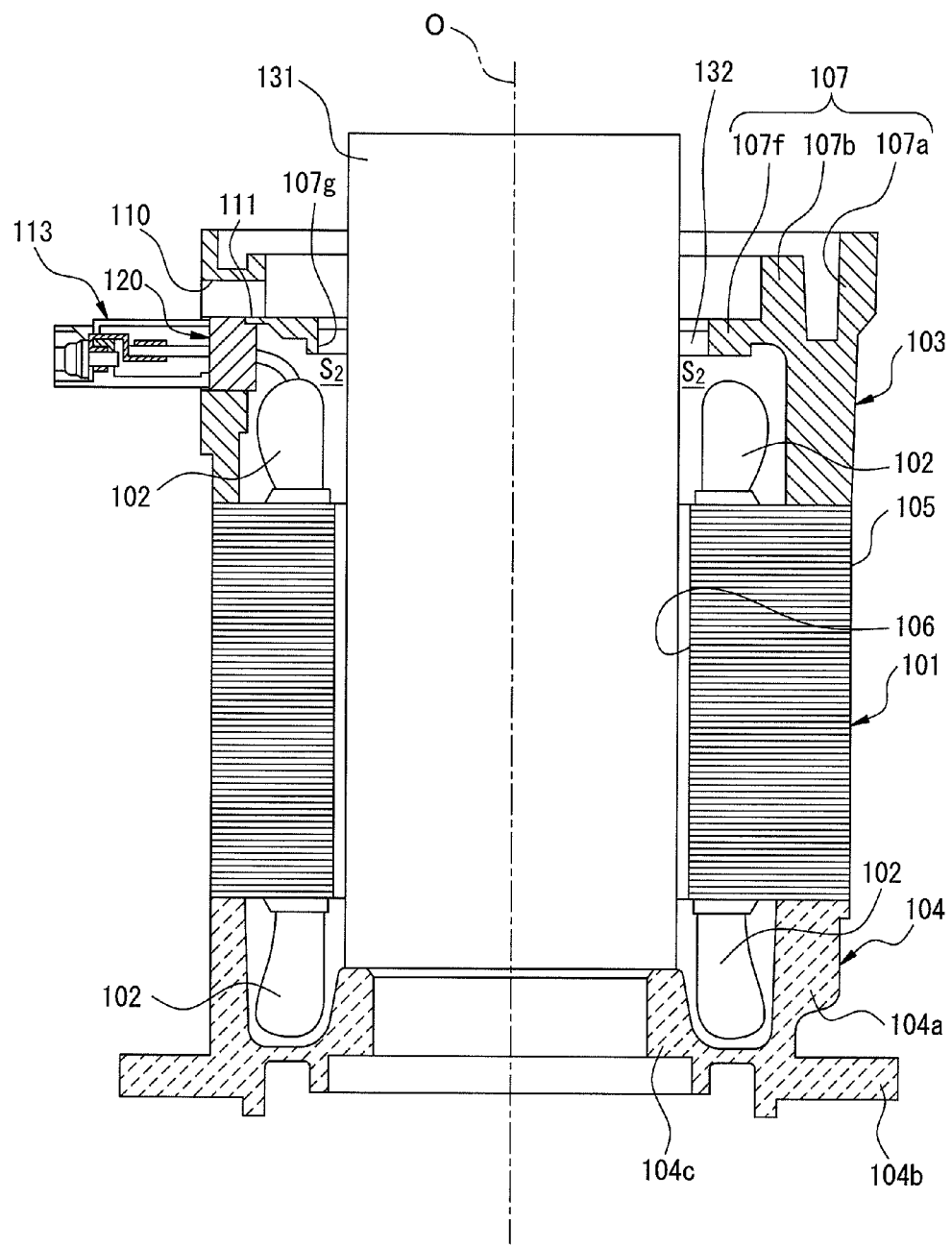
FIG. 8 is a side cross-sectional view of the stator in the state after step S3 in FIG. 4.

After executing step S26, the flow of step S2 shown in FIG. 5 is ended, and the routine proceeds to step S3 shown in FIG. 4. At step S3, the manufacturer places the core 131 inside the stator core 101. Specifically, as shown in FIG. 8, the manufacturer inserts the columnar-shaped core 131 having a predetermined diameter into the internal space defined by the inner surface 106 of the stator core 101 so as to be concentric with the axis O. At this time, the lower end face of the core 131 abuts against the ridge part 104c of the lower bracket 104, while the core 131 passes through the opening 107g provided at the flange 107f of the upper bracket 103, and extends upward from the upper bracket 103.

At step S4, the manufacturer fills resin in the internal space $S_2$ defined by the brackets 103 and 104 and stator core 101. More specifically, as shown in FIG. 8, the manufacturer fills resin (not shown) from the resin filling part 132 defined between the core 131 and the opening 107g provided at the flange 107f of the upper bracket 103.

The resin filled from the resin filling part 132 flows downward due to the action of gravity and is gradually filled in the internal space $S_2$ defined between the core 131 and the lower bracket 104, stator core 101, and upper bracket 103. The resin is filled in the internal space $S_2$ so as to reach a position right below the flange 107f of the upper bracket 103. By this operation, the coil 102 as a whole is covered by the resin. After step S4 is executed, the flow according to the present embodiment is ended.

According to the present embodiment, since the opening 110 provided at the upper bracket is tightly sealed by the seal member 120, it is possible to reliably prevent the resin from leaking to the outside through the opening 110 when filling the resin at step S4. Therefore, it is possible to fill the resin in the internal space of the stator core and the brackets in the state where the brackets are attached to the stator core in advance, while preventing leakage of resin. Due to this, a mold motor with brackets, in which the heat dissipation effect is improved by the resin, can be produced with a low cost and excellent productivity method, without requiring any special molds.

Further, according to the present embodiment, the lead wires 112 are guided by the through holes 128 of the seal member 120 and are led through the opening 110 to the outside of the electric motor 10 while being reliably separated from the side wall 107 of the upper bracket 103. Due to this, it is possible to ensure the insulation of the lead wires 112 from the upper bracket 103, since the contact of the lead wires 112 with the side wall 107 can be surely prevented.

Figure 9A:
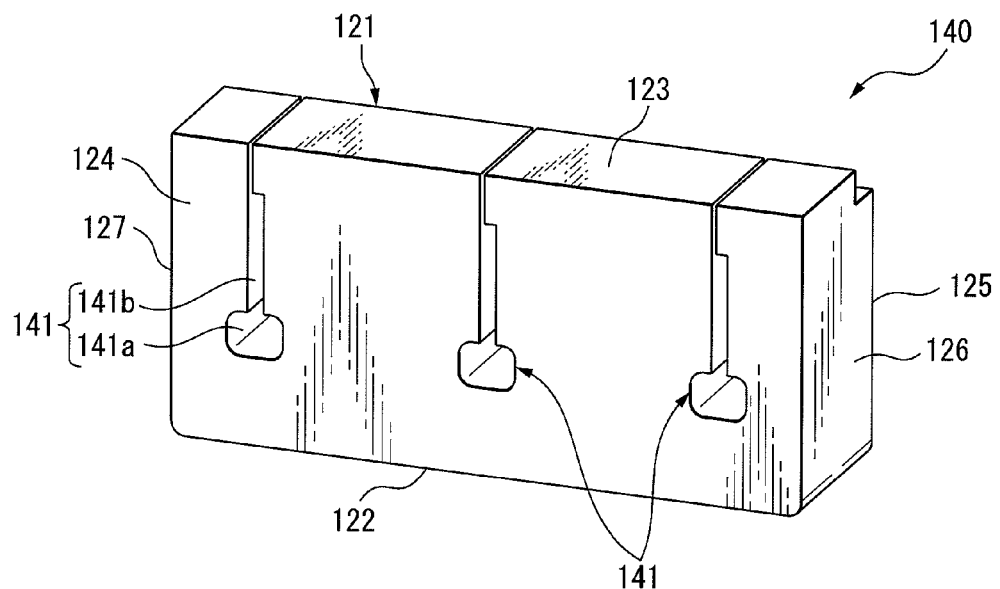
FIG. 9A is a perspective view of a seal member according to another embodiment of the invention.

Note that, a variety of types of a seal member other than the above-mentioned seal member 120 can be applied to the invention. Below, referring to FIGS. 9A and 9B, a seal member 140 according to another embodiment of the invention will be explained. Note that, elements similar to the above-mentioned seal member 120 are assigned the same numeral references and detailed explanations thereof will be omitted. The seal member 140 includes a main body 121 similar to the above seal member 120; and through holes 141 according to the present embodiment.

The main body 121 is formed with a total of three through holes 141. Each of the through holes 141 extends from the inner surface 125 to the outer surface 124 of the main body 121. Each of the through holes 141 includes a first hole part 141a into which a lead wire 112 is inserted; and a second hole part 141b extending from the first hole part 141a toward the upper surface 123 of the main body 121.

The first hole part 141a has a rectangular shape with rounded corners, while the second hole part 141b has a rectangular shape long in the up-down direction. The first hole part 141a has an outer shape which is larger than a conductor wire 112a of the lead wire 112 and which is smaller than a covering 112b of the lead wire 112. Further, the second hole part 141b has a left-right direction width smaller than the first hole part 141a.

Figure 9B:
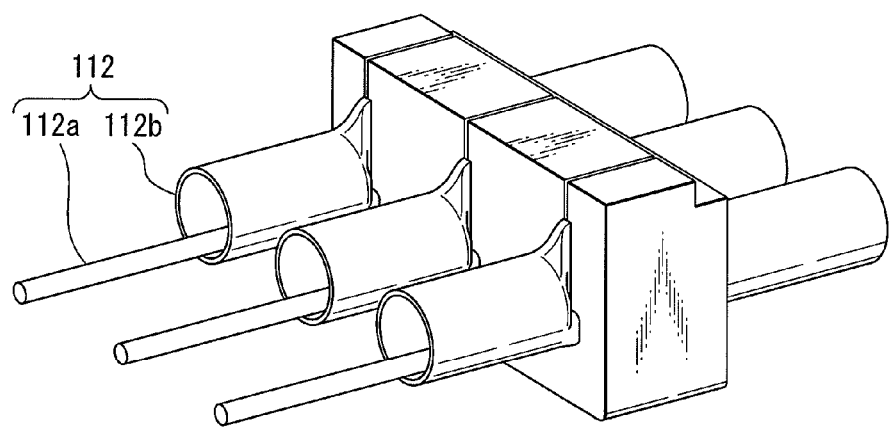
FIG. 9B illustrates the state where lead wires are inserted into the through holes of the seal member shown in FIG. 9A.

As shown in FIG. 9B, when the lead wire 112 is inserted into the first hole part 141a of the through hole 141, the wall surface defining the first hole part 141a crushes the covering 112b of the lead wire 112, and a part of the covering 112b is housed in the second hole part 141b. According to the seal member 140 according to the present embodiment, even when a gap is formed between the covering 112b and conductor wire 112a of the lead wire 112, the lead wire 112 can be held in the through hole 141 without clearance. Due to this, when filling resin in the stator core at the above-mentioned step S4, it is possible to effectively prevent the resin from leaking out through the clearance between the lead wire 112 and the through hole 141.

Note that, in the above-mentioned embodiment, the case where the stator core had an upper bracket and lower bracket, that is, two brackets, attached, was explained. However, the invention is not limited to this. So long as defining an internal space together with the stator core for filling a resin, it is also possible to attach a single bracket to the stator core or possible to attach three or more brackets to the stator core.

Further, in the above-mentioned embodiment, the case where the opening of the upper bracket had a substantially rectangular outer shape was explained, but the invention is not limited to this. For example, it may also be a polygonal shape, circular shape, or elliptical shape. In this case, the seal member is configured to have a main body of an outer shape corresponding to the shape of the opening.

Further, in the above-mentioned embodiment, the abutting part is formed at the side wall of the upper bracket, and both step S24 of deforming the seal member by holding it between the terminal plate and the abutting part and step S26 of expanding the seal member by heating it are performed. However, the invention is not limited to this. For example, the seal member can be tightly contact the wall surface of the opening by performing only step S26, without providing the abutting part at the side wall of the upper bracket, and without performing step S24.

In this case, the seal member may be configured so that the upper surface of the main body of the seal member tightly contacts the upper wall surface of the opening without clearance when the seal member is expanded by step S26. In addition, in the case of providing the abutting part at the side wall of the upper bracket, it is also possible to make the seal member tightly contact the wall surface of the opening by performing only step S24, without performing step S26. In this way, even if performing only one of steps S24 and S26, the seal member can sufficiently prevent leakage of the resin from the opening.

Further, in the above-mentioned embodiment, the abutting part fits into the notch of the seal member. However, the invention is not limited to this. The abutting part may contact (or surface-contact) at least part of the inner surface of the seal member.

As explained above, according to the invention, the opening which is provided at the upper bracket is tightly sealed by the seal member, so when performing the step of filling the resin, the resin can pass through the opening and be reliably prevented from ending up leaking to the outside.

For this reason, it is possible to fill the resin in the internal space of the stator core and bracket in the state with the bracket attached to the stator core in advance while preventing leakage of the resin. Due to this, it becomes possible to manufacture a mold motor with a bracket which is improved in heat dissipation effect by the resin without requiring special molds and by a low cost, superior productivity method.

Above, the invention was explained through embodiments of the invention, but the above embodiments do not limit the invention relating to the claims. Further, all combinations of features which were explained in the embodiment are not necessarily essential for the invention. Further, the above embodiments can be changed or improved in various ways as clear to a person skilled in the art. Such changed or improved embodiments are also included in the technical scope of the invention as clear from the claim language.

Further, it should be noted that the operations, routines, steps, stages, and other processing in the apparatus, system, program, and method in the claims, specification, and drawings, unless particularly clearly indicated by "before", "in advance of", etc. or the output of prior processing being used for later processing, can be realized in any order. In the flow of operations in the claims, specification, and drawings, even if explained using "first", "next", etc. for convenience, this does not mean the execution in this order is essential.

The invention claimed is:

1. A stator comprising:
   a stator core around which a coil is wound;
   a cylindrical bracket attached to the stator core, the bracket including:
   a side wall extending around a center axis of the stator core so as to surround a coil end of the coil, and having an outer surface which defines an outer circumferential surface of the stator;
   an opening for leading out a lead wire of the coil, the opening having a major axis in a radial direction, the opening being formed so as to extend through the side wall in the radial direction wherein the radial direction is perpendicular to the center axis, the opening being defined by first and second wall surfaces separate from each other in the direction of the center axis so as to be opposite to each other, and third and fourth wall surfaces extending between the first and second wall surfaces so as to be opposite to each other; and
   an abutting part having an end face arranged in the opening so as to face the outside of the bracket, the abutting part extending between the third and fourth wall surfaces at a position between the first and second wall surfaces;
   a seal member arranged in the opening so as to tightly contact a wall surface defining the opening without clearance to seal the opening, and including a through hole for receiving the lead wire;
   a resin arranged in an internal space defined by the bracket and the stator core: and
   a terminal plate attached to the bracket so as to press the seal member from the outside in the radial direction,
   wherein the end face of the abutting part abutting against the seal member from the inside in the radial direction of the bracket,
   whereby the seal member is held between the terminal plate and the end face of the abutting part and deformed so as to tightly contact the wall surface.

2. The stator according to claim 1, wherein the through hole includes:
   a first hole part into which the lead wire is inserted; and
   a second hole part extending from the first hole part toward an upper surface of the seal member and having a width smaller than the first hole part.

3. The stator according to claim 2, wherein the coil includes a conductor wire and a covering which surrounds the conductor wire, wherein
   when the lead wire is inserted into the first hole part, the covering is crushed by a wall surface defining the first hole part, and a part of the covering is housed in the second hole part.

4. An electric motor comprising the stator according to claim 1.

5. The stator according to claim 1, wherein the first wall surface is arranged closer to the stator core than the second wall surface,
   wherein the lead wire of the coil passes through a space defined between the first wall surface and the abutting part so as to be led to the outside.

6. A stator comprising
   a stator core around which a coil is wound;
   a cylindrical bracket having a center axis and attached to the stator core, the bracket including:
   an opening for leading out a lead wire of the coil; and
   an abutting part having an end face arranged in the opening so as to face the outside of the bracket, the end face of the abutting part abutting against the seal member from the inside in the radial direction of the bracket;
   a seal member arranged in the opening so as to tightly contact a wall surface defining the opening without clearance to seal the opening, and including a through hole for receiving the lead wire;
   a terminal plate attached to the bracket so as to press the seal member from the outside in the radial direction; and
   a resin arranged in an internal space defined by the bracket and the stator core,
   wherein the seal member is held between the terminal plate and the end face of the abutting part and deformed so as to tightly contact the wall surface,
   wherein the seal member includes:
   a main body having a bottom surface, a upper surface opposite to the bottom surface, an inner surface facing the center axis of the stator core, and an outer surface opposite to the inner surface;
   the through hole extending from the inner surface to the outer surface;
   a slit formed at the main body so as to extend from the upper surface to the through hole; and
   a notch formed along the corner at which the upper surface and the inner surface intersect.

* * * * *